United States Patent [19]
Ohtsu

[11] 3,821,836
[45] July 2, 1974

[54] THROW AWAY CUTTER INSERT
[75] Inventor: Yasuo Ohtsu, Itami, Japan
[73] Assignee: Sumitomo Electric Industries, Ltd., Osaka, Japan
[22] Filed: Feb. 8, 1973
[21] Appl. No.: 330,506

[30] Foreign Application Priority Data
Feb. 17, 1972  Japan.............................. 47-15985

[52] U.S. Cl. ............................................... 29/95
[51] Int. Cl. ............................................. B26d 1/00
[58] Field of Search................................. 29/95, 96

[56] References Cited
UNITED STATES PATENTS
3,229,349   1/1966   Leskell................................. 29/95
3,464,098   9/1969   Moore et al. ........................ 29/96
3,497,933   3/1970   Okada.................................. 29/95
3,541,655   11/1970  Stier.................................... 29/95

FOREIGN PATENTS OR APPLICATIONS
1,508,567   11/1967   France................................... 29/95
  951,624    3/1964   Great Britain......................... 29/95

Primary Examiner—Harrison L. Hinson
Attorney, Agent, or Firm—Kurt Kelman

[57] ABSTRACT

A reversible throw away polygonal insert for use in a milling cutter head having two parallel opposite major surfaces and a plurality of sides intersecting said major surfaces at right angles thereto in which the corner at the juncture between each adjacent sides of said plurality of sides is formed in a curved surface along a cylindrical surface which intersects the opposite major surfaces at a preselected angle thereto to provide two convexedly and oppositely directed curved cutting edges thereat.

5 Claims, 6 Drawing Figures

PATENTED JUL 2 1974 3,821,836

Fig. 4A
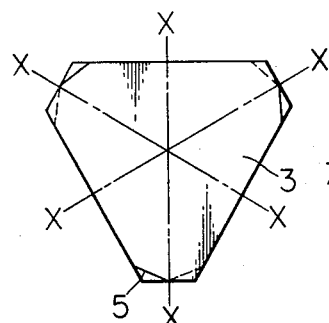
Fig. 4B
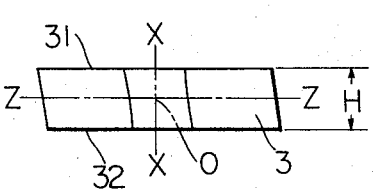
Fig. 5A
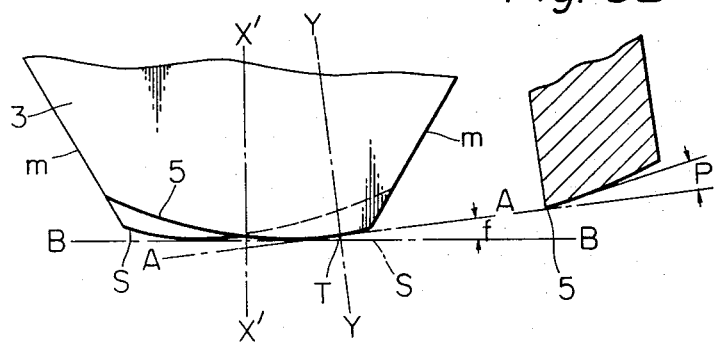
Fig. 5B
Fig. 6A
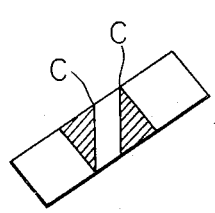
Fig. 6B
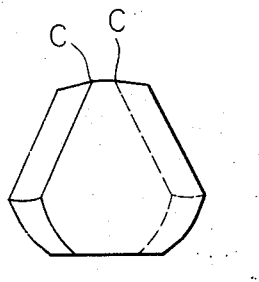

THROW AWAY CUTTER INSERT

BACKGROUND OF THE INVENTION

This invention relates to a throw away insert and, more particularly, to a reversible throw away cutter element or insert for use in a face milling cutter head.

One of most important characteristics for an insert for use in a face milling cutter head is to rapidly guide and remove chips which are continuously generated by the cutting edge of the insert out of its adjacent space. There have been proposed and practically employed a number of face milling cutter inserts which have the above-mentioned necessary characteristic. One of the most commonly employed prior art face milling cutter inserts is one which has chamfered face areas on one of the two parallel opposite major surfaces of the square insert 1 at the corners defined by the junctions between adjacent sides of the square insert so as to provide cutting edges on the chamfered face areas as shown in FIGS. 1A and 1B. In use, the insert is mounted in the milling cutter head so that the edge lines $m$ serve as main cutting edges and the edge lines $s$ serve as face cutting edges. Although such a conventional cutter insert 1 can be easily produced because of the simpleness of its configuration, only one side of the opposite parallel major surfaces is available as rake surface, thus lowering economical efficiency of the insert.

In another type of prior art throw away cutter insert, as shown in FIGS. 2A and 2B, both the parallel opposite major surfaces of the square insert 2 are chamfered in opposite directions at an angle to the respectively associated major surfaces at the corners defined by adjacent sides of the square configuration so that each of the insert corners is in a point-symmetrical relationship to the center point of the corner O. In the prior art throw away insert shown in FIGS. 2A and 2B, both the opposite major surfaces of the insert body are available as rake surface thereby doubling the number of available cutting edges as compared with those of the first-mentioned prior art throw away insert of FIGS. 1A and 1B. However, the increase in the number of chamfered surfaces makes the processing of such an insert complicated in attaining the precise point-symmetry for the cutting edges referred to above, resulting in a rise in cost.

Furthermore, in the prior art throw away cutter insert of FIGS. 2A and 2B, it has been well known that, in order to reduce unevenness on a finished surface of a work (roughness of a finished surface of a work piece to be cut by the insert), the face cutting edges $s$ of the insert preferably present a convexedly curved face to a surface of the work piece to be milled thereby. However, the production of such a throw away insert having cutting edges with a convexed curve involves such complicated process steps that production of such a throw away insert is almost rendered impracticable.

SUMMARY OF THE INVENTION

Therefore, one principal object of the present invention is to provide a novel and improved reversible throw away insert for use in a milling cutter head which can effectively eliminate the disadvantages inherent in the prior art milling cutter throw away inserts referred to above.

Another object of the present invention is to provide a novel and economical throw away insert for use in a milling cutter head which has an increased number of available cutting edges and can be produced at less expense.

A further object of the present invention is to provide a novel and improved throw away insert for use in a milling cutter head which can reduce unevenness on a finished surface of a work piece to be processed by the insert and has an excellent chip removal characteristic.

According to the present invention, the above objects can be attained by providing a reversible throw away insert for use in a milling cutter head which comprises a polygonal body having two opposite parallel major surfaces and a plurality of side faces intersecting said opposite major surfaces at right angles thereto and in which each of the corners defined by the junctions between adjacent side faces of said polygonal insert body has a curved surface formed by a cylindrical surface which has an axis at right angles to the line of intersection between the bisector plane of the angle included by the side faces at said corner and the bisector plane parallel to and bisecting the distance between said parallel major surfaces, said axis intersecting said opposite parallel major surfaces of said insert body at an angle other than a right angle to the surfaces.

BRIEF DESCRIPTION OF THE DRAWINGS

These and other objects and attendant advantages of the present invention will be more readily apparent to those skilled in the art from a reading of the following detailed description in conjunction with the accompanying drawings wherein:

FIG. 4A is a plan view of one embodiment of a throw away insert constructed in accordance with the present invention;

FIG. 4B is an elevational view of said throw away insert of FIG. 4A;

FIG. 5A is a fragmentary view on an enlarged scale of a portion of said throw away insert of FIGS. 4A and 4B;

FIG. 5B is a cross-sectional view taken along the line Y — Y of FIG. 5A; and

FIGS. 6A and 6B show another embodiment of a throw away insert constructed in accordance with the present invention and in which FIG. 6A shows said insert in an elevational view at an angle to the horizon and FIG. 6B is an isometric plan view of the insert of FIG. 6A.

DESCRIPTION OF PREFERRED EMBODIMENTS OF THE INVENTION

Figure 3A:
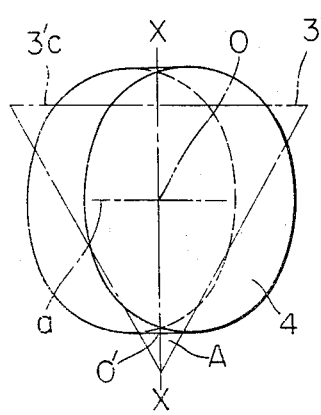
FIG. 3A is a view showing the positional relationship between a cylindrical cutting surface along which the chamfer is formed and an insert blank to be processed to a complete throw away insert embodying the present invention where said cylindrical surface is shown in an isometric view and said insert blank is shown in a plan view.
Figure 3B:
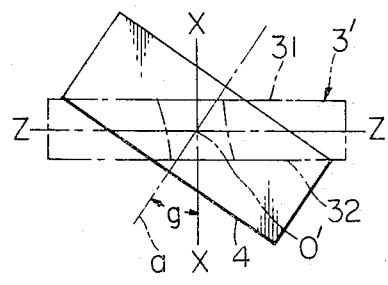
FIG. 3B is a view as seen at a right angle to FIG. 3A.

The present invention will be described referring to the accompanying drawings and more particularly, to FIG. 3A through FIG. 5B in which one preferred embodiment of a negative regular throw away insert in accordance with the present invention is illustrated. In these Figures, reference numeral 3' denotes a regular triangular insert blank to be processed to form a negative throw away insert of the invention. The blank has opposite plane major surfaces 31 and 32 which are parallel to each other. Reference numeral 4 denotes a cylindrical insert cutting surface along which the apices A of the blank 3' are cut off to provide negative corners each having two oppositely directed faces at the edge. The cylindrical cutting surface 4 may be of truly circular or elliptical cross-section. In FIGS. 3A and 3B, the axis $a$ of the cylindrical insert cutting surface 4 extends through the point of intersection O which is on the line of intersection between (a) the bisector plane X — X bisecting included angle of adjacent sides at the corner to be cut off and (b) the bisector plane Z — Z parallel to and bisecting the distance between the opposite parallel major surfaces 31 and 32 of the insert blank 3'. The axis is perpendicular to the said line of intersection between (a) and (b). As shown in FIG. 3B of the drawings, the axis $a$ of the cylindrical insert cutting surface 4 is disposed at an angle g with respect to the opposite parallel surfaces 31 and 32 of the insert. FIGS. 4A and 4B show a complete negative regular triangular throw away insert 3 produced by cutting off the apices A of the blank 3' along the cylindrical cutting surface 4 as shown in FIGS. 3A and 3B.

One typical positioning of the throw away insert 3 will be now described referring to FIGS. 5A and 5B of the accompanying drawings in which the insert 3 is employed in a milling cutter head (not shown). In this positioning, the insert 3 is positioned in the milling cutter head so that the cutting face defines a rectilinear line A — A which intersects a rectilinear line B — B at a rightwardly up-angle f which line B — B intersects a bisector X' — X' of the corner. With this positioning of the insert 3, at the contact point between the rectilinear line A — A and the edge line 5 of one major plane surface of the insert there is obtained a positive relief angle P as seen in FIG. 5B. That is, when the curved portion adjacent the contact point T (the right-hand half portion of the edge line 5) is employed as the face cutting edge $s$ and each of the edge lines of the insert blank 3' is employed as a main cutting edge $m$, respectively, the insert will have an excellent chip removal characteristic.

This will be in more detail described by way of one example hereinbelow.

When the insert blank 3' is a regular triangle column, the angle g is 34.3° and the angle f is 15°, respectively, the relief angle P is calculated as P ≈ 10.0°. And when the tool geometry of the milling cutter is so set that the radial rake angle is 12°, the axial rake angle is 4° and the entering angle is 45°, then the actual relief angle of the main cutting edge $m$ and the face cutting edge $s$ becomes about 6°, the true rake angle about 6° and the reclining angle of the main cutting edge about 11°. This geometry provides a tooth for use in a milling cutter head having an improved chip removal characteristic.

As mentioned above, after the insert blank 3' has been cut off along the cylindrical insert cutting surface 4 as shown in FIGS. 3A and 3B, the resultant insert 3 has chamfered cutter edges formed at the removed apices and the chamfered corners are in a point-symmetric relationship with respect to the center point of the said corners O', and therefore, both intersecting edges at the opposite major surfaces of the insert can serve as face cutting edges.

Figure 1A:
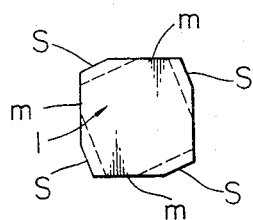
FIGS. 1A and 1B show one most commonly employed type of prior art throw away cutter insert in plan and elevational view, respectively.
Figure 1B:
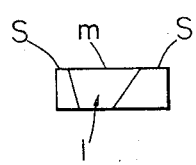
Figure 2A:
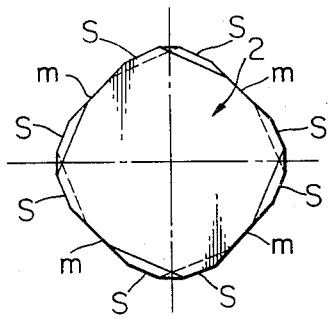
FIGS. 2A and 2B show another prior art type of throw away cutter insert in plan and elevational view, respectively.
Figure 2B:
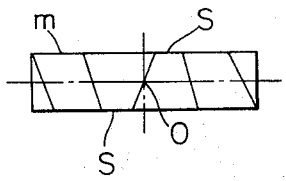

Thus, it will be appreciated that the insert of this invention is reversible. As shown in FIGS. 3A and 3B, the cutter insert 3 of the invention can be easily produced by forming the regular triangle insert blank 3' along the true cylindrical surface 4. On the other hand, although the prior art milling cutter insert 2 as shown in FIGS. 2A and 2B is reversible as the insert of this invention, it has to go through two steps of chamfer-forming procedure which makes it costly or difficult to produce the insert with a high precision.

Furthermore, the face edges on the insert 3 of the invention present a convexed curve configuration and give a fine finish surface to the work as well as the improved chip removal characteristic as mentioned hereinabove.

Furthermore, as is clear from the showing in FIGS. 5A and 5B, in the cutting operation by the use of the insert 3, only the right-hand half portion of the edge line 5 (as seen in FIG. 5A) performs a cutting function whereas the left-hand half portion of the edge line 5 (as seen in FIG. 5A) does not perform any cutting function, according to the present invention. Therefore, in a modification, both outer parts of the chamfering surface are formed as planes (FIGS. 6A and 6B; indicated by the hatching) which either contact the central parts (Area C—C in FIG. 6) formed as true cylindrical surface at point C or near-by.

Although the invention has been described referring to the negative regular triangle throw away inserts for use in a milling cutter head as illustrated, it will be apparent that the invention can be equally applicable to square, hexagonal and other polygonal throw away inserts.

The present invention has been thus far described referring to preferred embodiments thereof in connection with the drawings. It must be understood, however, that the present invention is not limited to the embodiments described and illustrated herein but broadly covers all the variations and modifications without departing the spirit and the scope of the present invention defined in the appended claims.

What is claimed is:

1. In a reversible throw away insert for use in a milling cutter head, which comprises a polygonal insert body having two major surfaces opposite and parallel to each other, a plurality of side faces intersecting the major surfaces at right angles thereto, adjoining ones of the sides faces defining corners at respective junctions thereof, and each of the corners having a curved face: the curved face of each corner being formed by a cylindrical surface having an axis extending perpendicularly to a line of intersection between the bisector plane of an angle included by the adjoining side faces at said corner and the bisector plane parallel to and bisecting the distance between the major surfaces, and the cylindrical surface axis being disposed at an angle other than a right angle in respect of the major surfaces.

2. The reversible throw away insert for use in a milling cutter head as set forth in claim 1, in which said cylindrical surface has a true circle cross-section.

3. The reversible throw away insert for use in a milling cutter head as set forth in claim 1, in which said cylindrical surface has an ellipsoidal cross-section.

4. The reversible throw away insert for use in a milling cutter head as set forth in claim 1, in which said insert has a negative triangular shape.

5. The reversible throw away insert for use in a milling cutter head as set forth in claim 1, in which each of said corners has an edge which includes a straight non-cutting edge portion.

* * * * *